United States Patent
Khoury et al.

(10) Patent No.: US 12,451,138 B2
(45) Date of Patent: Oct. 21, 2025

(54) CROSS-LINGUAL SPEAKER RECOGNITION

(71) Applicant: Pindrop Security, Inc., Atlanta, GA (US)

(72) Inventors: Elie Khoury, Atlanta, GA (US); Tianxiang Chen, Atlanta, GA (US); Avrosh Kumar, Atlanta, GA (US); Ganesh Sivaraman, Atlanta, GA (US); Kedar Phatak, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 267 days.

(21) Appl. No.: 17/977,521

(22) Filed: Oct. 31, 2022

(65) Prior Publication Data
US 2023/0137652 A1 May 4, 2023

Related U.S. Application Data

(60) Provisional application No. 63/274,909, filed on Nov. 2, 2021, provisional application No. 63/274,460, filed on Nov. 1, 2021.

(51) Int. Cl.
*G10L 15/00* (2013.01)
*G10L 17/00* (2013.01)
(Continued)

(52) U.S. Cl.
CPC .............. *G10L 17/04* (2013.01); *G10L 17/10* (2013.01)

(58) Field of Classification Search
CPC ......... G10L 17/00; G10L 17/04; G10L 17/10; G10L 17/08; G10L 25/90; G10L 25/75;
(Continued)

(56) References Cited

U.S. PATENT DOCUMENTS

2016/0372121 A1* 12/2016 Li .................... G10L 17/24
2021/0074295 A1 3/2021 Moreno et al.
(Continued)

FOREIGN PATENT DOCUMENTS

CN 111742364 B * 8/2024 ............. G06F 40/58

OTHER PUBLICATIONS

International Search Report and Written Opinion on PCT App. PCT/US2022/048365 dated Apr. 25, 2023 (21 pages).
(Continued)

*Primary Examiner* — Michael Ortiz-Sanchez
(74) *Attorney, Agent, or Firm* — Foley & Lardner LLP

(57) ABSTRACT

Disclosed are systems and methods including computing-processes executing machine-learning architectures for voice biometrics, in which the machine-learning architecture implements one or more language compensation functions. Embodiments include an embedding extraction engine (sometimes referred to as an "embedding extractor") that extracts speaker embeddings and determines a speaker similarity score for determine or verifying the likelihood that speakers in different audio signals are the same speaker. The machine-learning architecture further includes a multi-class language classifier that determines a language likelihood score that indicates the likelihood that a particular audio signal includes a spoken language. The features and functions of the machine-learning architecture described herein may implement the various language compensation techniques to provide more accurate speaker recognition results, regardless of the language spoken by the speaker.

15 Claims, 4 Drawing Sheets

(51) Int. Cl.
*G10L 17/04* (2013.01)
*G10L 17/10* (2013.01)

(58) Field of Classification Search
CPC ......... G10L 25/51; G06F 21/31; G06F 21/30; G06F 21/45; G06F 40/58
See application file for complete search history.

(56) References Cited

U.S. PATENT DOCUMENTS

| | | |
|---|---|---|
| 2021/0200965 A1 | 7/2021 | Yerli |
| 2021/0256981 A1 | 8/2021 | Moreno et al. |
| 2021/0280171 A1* | 9/2021 | Phatak ................... G06N 20/00 |
| 2021/0326421 A1* | 10/2021 | Khoury ................... G10L 17/08 |
| 2023/0089902 A1* | 3/2023 | Arkhangorodsky .... G06F 40/58 |
| | | 704/277 |

OTHER PUBLICATIONS

Invitation to Pay Additional Fees on PCT App. PCT/US2022/048365, dated Feb. 2, 2023 (2 pages).

* cited by examiner

CROSS-LINGUAL SPEAKER RECOGNITION

CROSS-REFERENCE TO RELATED APPLICATIONS

This application claims priority to U.S. Provisional Application No. 63/274,460, filed Nov. 1, 2021, and U.S. Provisional Application No. 63/274,909, filed Nov. 2, 2021, each of which is incorporated by reference in its entirety.

TECHNICAL FIELD

This application generally relates to systems and methods for managing, training, and deploying a machine learning architecture for audio processing and voice biometrics.

BACKGROUND

Voice biometric-based operations are growing increasingly common, as voice-based channels are growing increasingly common, such as call centers and voice-interface devices, such as voice assistants. As voice biometrics grow more ubiquitous, the speaker recognition systems must be more robust and compensate for various different languages.

Conventional voice biometric systems should be capable of identifying the same speaker's voice across utterances, regardless of the language spoken. However, that is not the what the historical data indicates. Current voice biometric systems generate distinct speaker-recognition results when the speaker switches between languages. There could be any number of explanations for this discrepancy (e.g., humans behave and speak differently). Nevertheless, voice biometric systems should generally produce comparable outputs for the same speaker regardless of the language the speaker uses. What is needed is an improved voice biometric system, better configured for cross-lingual speaker recognition.

SUMMARY

Disclosed herein are systems and methods capable of addressing the above-described shortcomings and may also provide any number of additional or alternative benefits and advantages. Embodiments include a computing device that executes software routines for one or more machine-learning architectures. The embodiments described herein include the machine-learning architecture executed by computing devices for voice biometrics, in which the machine-learning architecture implements one or more language compensation functions. Embodiments include an embedding extraction engine (sometimes referred to as an "embedding extractor") that extracts speaker embeddings and determines a speaker similarity score for determine or verifying the likelihood that speakers in different audio signals are the same speaker. The machine-learning architecture further includes a multi-class language classifier that determines a language likelihood score that indicates the likelihood that a particular audio signal includes a spoken language. The features and functions of the machine-learning architecture described herein may implement the various language compensation techniques to provide more accurate speaker recognition results, regardless of the language spoken by the speaker.

Using the language likelihood scores from various audio signals, the machine-learning architecture may generate a cross-lingual quality measure indicating whether the languages detected in the various signal tend towards one language or another. If the language is the same across audio signals, then the quality measure produced using the embeddings extracted from those audio signals should be relatively low. If the language is different across audio signals, then quality measure produced using the embeddings extracted from those audio signals should be relatively high. The computing device may employ the quality measure in one or more ways to compensate for the langue different. In some cases, the computing device may use the quality measure to algorithmically correct or adjust (e.g., add or subtract) a speaker verification score. In some cases, the computing device may reference the quality measure to determine that further training of the machine-learning architecture is required where the quality measure exceeds a threshold. In some cases, the loss layers of the machine-learning architecture may retrain or tune the machine-learning architecture or embedding extractor using the quality measure as input when a loss function is applied to the training embeddings or other inputs.

The system may implement cross-lingual model fine-tuning. After training the embedding extractor (or the machine-learning architecture), the computing device may select a subset of training signals in which a speaker uses multiple languages. The computing device then applies the embedding extractor on this subset of training signals to fine-tune the trained hyper-parameters or weights of the machine-learning architecture.

Additionally or alternatively, the system may apply a flip signal augmentation operation on the training signals. The computing device reverses the audio signal or features of the audio signal along the time dimension to reverse the audio. The computing device applies the machine-learning architecture on the simulated signals based on flip signal augmentation to train the machine-learning architecture on seemingly different languages. Reversing the audio features of the audio signal simulates a different language while preserving the audio signal. Essentially, the speaker recognition engine should determine that the same speaker provided the raw audio signal and the corresponding simulated signal.

In some embodiments, a computer-implemented method comprises extracting, by a computer, an enrolled voiceprint for an enrolled speaker by applying an embedding extraction engine on one or more enrollment signals of the enrolled speaker; extracting, by the computer, an inbound voiceprint for an inbound speaker by applying the embedding extraction engine on one or more inbound signals of the inbound speaker; generating, by the computer, one or more language likelihood scores by applying a language classifier on the enrolled voiceprint and the inbound voiceprint indicating a likelihood that an enrollment signal and a paired inbound signal include a same language; and generating, by the computer, a cross-lingual quality measure based upon one or more differences of the one or more language likelihood scores generated for the one or more enrollment signals and the one or more inbound signals.

In some embodiments, a system comprises a non-transitory storage configured to store machine-executable instructions of an embedding extractor and a language classifier and a computer in communication with the non-transitory storage. The computer comprises a processor and configured to: extract an enrolled voiceprint for an enrolled speaker by applying the embedding extractor on one or more enrollment signals of the enrolled speaker; extract an inbound voiceprint for an inbound speaker by applying the embedding extraction engine on one or more inbound signals of the inbound speaker; generate one or more language likelihood scores by applying the language classifier on the enrolled voiceprint and the inbound voiceprint indicating a likelihood that an enrollment signal and a paired inbound signal include a same language; generate a cross-lingual quality measure based upon one or more differences of the one or more language likelihood scores generated for the one or more enrollment signals and the one or more inbound signals; generate a speaker verification score for the inbound speaker based upon a distance between the enrolled voiceprint and the inbound voiceprint; and update the speaker verification score according to the cross-lingual quality measure for calibrating the distance.

In some embodiments, a computer-implemented method comprises extracting, by the computer, a plurality of training embeddings extracted for a plurality of training audio signals and a corresponding plurality of training labels, each training label indicating in part one or more languages spoken in a corresponding training audio signal; training, by the computer, an embedding extractor by applying a loss function on the plurality of training embeddings and the plurality of training labels; selecting, by the computer, a subset of training audio signals of the plurality of training audio signals having a plurality of languages according to a subset of training labels of the plurality of training labels; and retraining, by the computer, the embedding extractor by applying the loss function on each training embedding for the subset of training embeddings and each corresponding training label subset of training labels.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
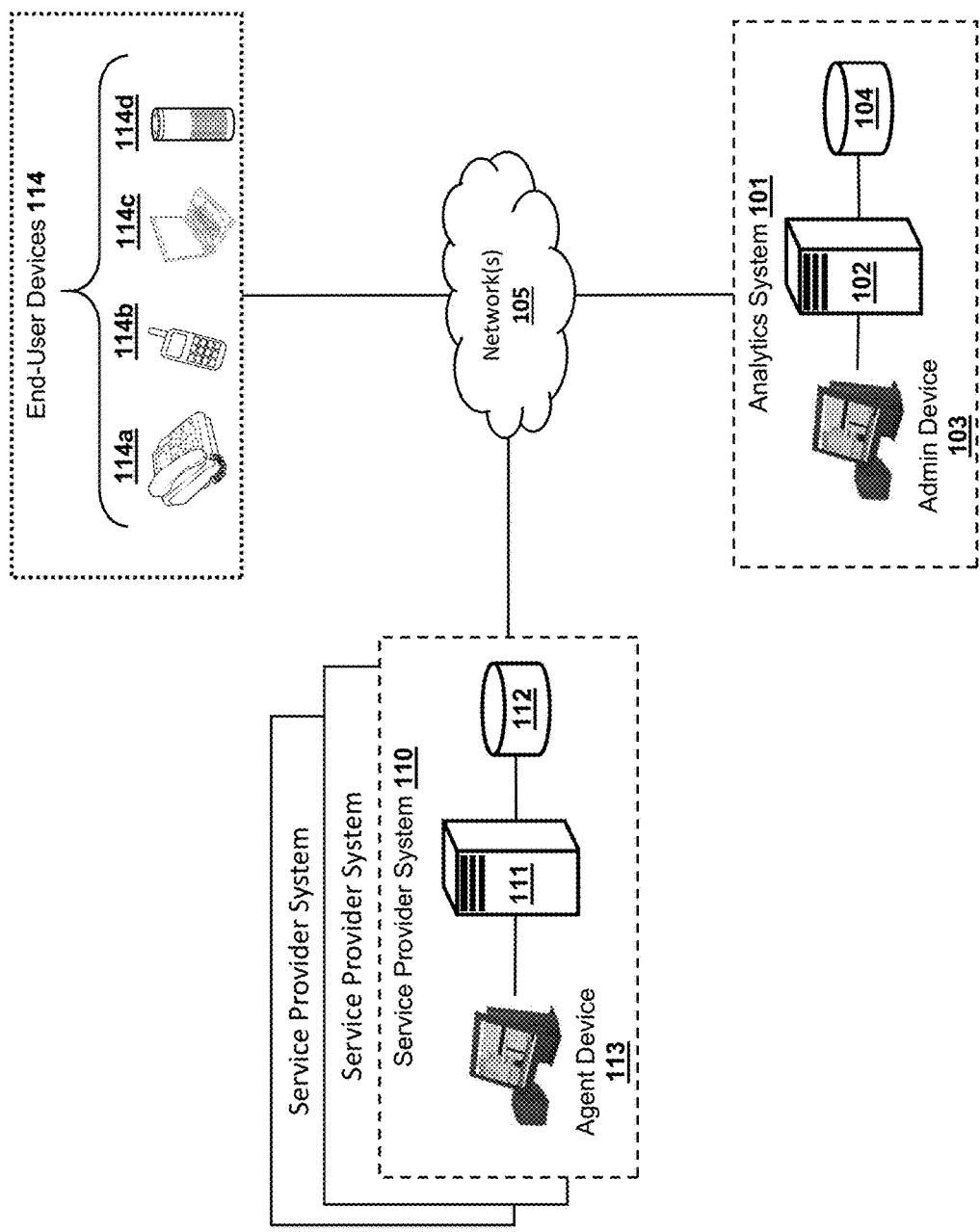
FIG. 1 shows components of a system for processing audio signals according to various language compensation functions of a machine-learning architecture, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 shows components of a system 100 for processing audio signals and voice biometrics, such as processing authentication requests on behalf of a variety of computing services accessed by end-users. The system 100 comprises enterprise-computing infrastructures 101, 110, including an analytics system 101 and one or more service provider systems 110. The system 100 further includes any number of end-user devices 114a-114c (collectively referred to as an "end-user device 114" or "end-user devices 114"). The system 100 includes one or more external networks 110 hosting and conducting communications amongst components of the enterprise computing infrastructures 101, 110 and the end-user devices 114. Component devices of the analytics system 101 may communicate via one or more internal networks (not shown) of the 101. Likewise, the component devices of a service provider system 110 may communicate via one or more internal networks (not shown). Embodiments may comprise additional or alternative components or omit certain components from those of FIG. 1 and still fall within the scope of this disclosure. It may be common, for example, to include multiple analytics servers 102. Embodiments may include or otherwise implement any number of devices capable of performing the various features and tasks described herein. For instance, FIG. 1 shows the analytics server 102 as a distinct computing device from the analytics database 104. In some embodiments, the analytics database 104 includes an integrated analytics server 102.

The system 100 includes one or more external networks 105 and/or internal networks (not shown) comprising various hardware and software components of one or more public or private networks, interconnecting the various components of the system 100. Non-limiting examples of such internal or external networks 105 may include Local Area Network (LAN), Wireless Local Area Network (WLAN), Metropolitan Area Network (MAN), Wide Area Network (WAN), and the Internet. The communication over the external networks 105 may be performed in accordance with various communication protocols, such as Transmission Control Protocol and Internet Protocol (TCP/IP), User Datagram Protocol (UDP), and IEEE communication protocols. Likewise, the end-user devices 114 use the external networks 105 for communicating with the customer-facing service provider systems 110 or the analytics system 101 via telephony and telecommunications protocols, hardware, and software capable of hosting, transporting, and exchanging audiovisual data (e.g., computer files, data stream). Non-limiting examples of telecommunications and/or computing networking hardware may include switches and trunks, among other additional or alternative hardware used for hosting, routing, or managing data communication, circuits, and signaling via the Internet or other device communications medium. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Various different entities manage or organize the components of the telecommunications systems, such as carriers, networking or Internet service providers, and exchanges, among others.

The end-user devices 114 include any type of electronic device allowing users to access and interact with provider services of the service provider systems 110. The end-user device 114 includes a processor and non-transitory machine-readable memory containing instructions executable by the processor. The end-user device 114 comprises (or couples to peripheral devices) for receiving user inputs and capturing user biometric information (e.g., speaker voice, speaker face), such as a microphone, a camera or similar optical device (e.g., retinal scanner), keyboard, mouse, thumbprint scanner, and the like. Non-limiting examples of end-user devices 114 may include landline phones 114*a*, mobile phones 114*b*, calling computing devices 114*c* (personal computer (PC), laptop), or edge devices 114*d*, among other types of electronic devices capable of performing the functions of the end-user device 114. The edge device 114*d* may include any Internet of Things (IoT) device or other electronic device for network communications. The edge device 114*d* could be any smart device capable of executing software applications and/or performing voice interface operations. Non-limiting examples of the edge device 114*d* may include voice assistant devices, autonomous vehicles, smart appliances, smart TV, and the like.

The end-user device 114 further comprises or couples to hardware and software components for communicating with the provider systems 110 or the analytics systems 101 via the network 105. The end-user devices 114 include any communications or computing device that the end-user operates to access the services of the provider system 110 through the various communications channels. The end-user device 114 includes hardware (e.g., processor, non-transitory memory, microphone, audio speaker, camera) or software components for communicating over the network(s) 105 according to the particular communication channel (e.g., landline telephony, cellular telephony, conference software for audio or video conference, VoIP audio or video call). In operation, a speaker (end-user) may place a call to the provider system 110, or using the communications services hosted by the provider system 110, through a telephony network or through a software application executed by the end-user device 114. The landline phones 114*a* and mobile phones 114*b* are telecommunications-oriented devices (e.g., telephones) that communicate via telecommunications channels. The end-user device 114 is not limited to the telecommunications-oriented devices or telephony channels. For instance, in some cases, the mobile phones 114*b* may communicate via a computing network channel (e.g., the Internet). The end-user device 114 may also include an electronic device comprising a processor and/or software, such as the calling computing device 114*c* or edge device 114*d* implementing, for example, voice-over-IP (VoIP) telecommunications, data streaming via a TCP/IP network, or other computing network communications channel.

The user device 114 may comprise or couple to a microphone for capturing audio waves containing the user's utterances and generating electronic audio signals converted from analog audio signals including the audio waves, which the user device 114 processes and transmits as digital audio data representing the electronic audio signals. Additionally or alternatively, in some embodiments the user device 114 may comprise or couple to an optical device (e.g., camera) for capturing optical imagery information (e.g., still images, video, visual spectrum, infrared), which the user device 114 processes and transmits as digital image data representing the captured optical imagery. In some implementations, the user device 114 may further comprise or couple to an audio speaker for audio playback of digital audio data received by the user device 114.

In operation, the end-user may speak a number of input utterances during enrollment or deployment phases of the machine-learning architecture, which the microphone of the end-user device 114 captures as enrollment audio signals (sometimes referred to as "enrollment samples"), or as real-time inbound audio signals (sometimes referred to as "inbound samples" or "test samples"). The captured sound includes the background noise (e.g., ambient noises) and/or utterances of one or more speaker-users. Additionally or alternatively, the user inputs can include videos (or images) of users (e.g., facial expressions, gestures) captured by or uploaded to the end-user device 114. The end-user's inputs entered into the user interface may be entered into a physical or graphical user interface, such as a touch input swiping across the end-user device 114, using the end-user device 114 in a gesture, pressing buttons on the end-user device 114 (e.g., keypad dual-tone multi-frequency (DTMF) tones), inputting text, capturing biometric information such as a fingerprint, and the like.

The call analytics system 101 and the provider system 110 represent network infrastructures 101, 110 comprising physically and logically related software and electronic devices managed or operated by various enterprise organizations. The devices of each network system infrastructure 101, 110 are configured to provide the intended services of the particular enterprise organization. The analytics system 101 and service provider systems 110 represent computing network infrastructures 101, 110, comprising logically related software and/or physically related electronic devices, managed or operated by an enterprise organization hosting various types of services to the end-users, the end-user devices 114, or to other enterprise computing infrastructures 101, 110. The analytics system 101 comprises various hardware and software components that capture, analyze, and store various types of data or metadata related to the speaker's biometric information for the provider system 110. The provider system 110 comprises various hardware and software components that capture and store various types of data or metadata related to the speaker's contact with the provider system 110. This contact data (e.g., call data, visual data, device communication data) may include, for example, audio recordings of the call or the speaker's voice, visual data (e.g., still images, video recordings) of the speaker's face, and metadata related to the protocols and software employed for the particular communication channel.

The analytics system 101 includes hardware and software components performing analytics services and operations that support security postures on behalf of the service provider systems 110, by processing and analyzing data received from the end-user devices 114 via the provider systems 110 over the external networks 105. Non-limiting examples of the analytics services include user identification (e.g., voice recognition, facial recognition), speaker recognition (e.g., speaker diarization), user authentication, or other biometrics-related analytics about the end-users. The analytics service operates the analytics system 101 comprising various hardware, software, and networking components configured to host and provide the analytics services for the service provider systems 110. The component devices of the analytics system 101 execute various software programming for hosting and performing the intended analytics services and communicate via the one or more internal networks (not shown). The analytics system 101 receives various types of information from the service provider systems 110 (or end-user devices 114) over the networks 105 and, in some implementations, returns various outputs according to the provider systems 110 over the external networks 105. The analytics system 101 includes any number of analytics servers 102 and analytics databases 104, interconnected via the internal networks (not shown) and external networks 105, for performing the various features and functions described herein.

The analytics server 102 of the call analytics system 101 may be any computing device comprising one or more processors and software, and capable of performing the various processes and tasks described herein. The analytics server 102 may host or be in communication with the analytics database 104, and receives and processes call data (e.g., audio recordings, metadata) received from the one or more provider systems 110. Although FIG. 1 shows only a single analytics server 102, the analytics server 102 may include any number of computing devices. In some cases, the computing devices of the analytics server 102 may perform all or portions of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the provider system 110 (e.g., the provider server 111).

The analytics server 102 executes audio or video processing software that includes one or more machine-learning architectures having machine-learning layers (e.g., neural network layers) or machine-executed functions defining various functional engines, such as an embedding extraction engine (sometimes referred to as an "embedding extractor") and cross-lingual compensation engine (sometimes referred to as a "language engine"), among other potential layers or functions. Non-limiting examples of additional layers or functions of the machine-learning architecture may include engines for data augmentation, audio or visual signal pre-processing, audio or visual signal enhancement, speaker (audio or visual) verification or authentication, and speaker diarization, among others. For ease of description, the analytics server 102 executes a single machine-learning architecture having a neural network architecture with the various layers and functions, though the embodiments may include any number of machine-learning architectures implementing various types of machine-learning techniques or layers.

The analytics server 102 executes the software programming of the machine-learning architecture in various operational phases, including a training phase, a deployment phase (sometimes referred to as a "testing" or "inference" phase), and an optional enrollment phase. The analytics server 102 may enable or disable various functions, layers, or functional engines of the machine-learning architecture according to the particular operational phase (e.g., training, enrollment, deployment). For instance, the analytics server 102 enables and applies various classifier layers of the embedding extractor during the training phase, and disables the classifier layers of the embedding extractor during the deployment phase.

The analytics server 102 or other computing device (e.g., provider server 111) of the system 100 performs the various pre-processing operations and/or data augmentation operations on the input contact signals containing, for example, audio signal data or visual signal data. Non-limiting examples of the pre-processing operations on the input contact signals include: parsing the audio data into fixed frames or sub-frames; transforming the audio data from a time-domain representation into a frequency-domain representation according to an FFT of SFT algorithm; or performing normalization or scaling functions; among other potential pre-processing operations. Non-limiting examples of data augmentation operations include: performing flip signal augmentation; performing bandwidth expansion; down-sampling or up-sampling; audio clipping; noise augmentation; frequency augmentation; and duration augmentation; among other potential data augmentation operations.

In some cases, the analytics server 102 may perform one or more pre-processing or data augmentation operations prior to feeding an input signal (e.g., training signal, enrollment signal) into the input layers of the machine-learning architecture. In some cases, additionally or alternatively, the analytics server 102 executes one or more pre-processing or data augmentation operations when executing the machine-learning architecture, where the input layers (or other layers) of the machine-learning architecture perform the pre-processing or data augmentation operations. For example, in these cases, the machine-learning architecture comprises "in-network" input layers and/or data augmentation layers that perform the pre-processing operations and/or data augmentation operations on the input contact signal fed into the machine-learning architecture. The data augmentation operations (e.g., noise, babble, frequency augmentation, reverberation augmentation) generate various types of distortion or degradation of the input audio signal, such that the operational layers of the machine-learning architecture (e.g., embedding extractor; language classifier) ingest the resulting augmented or distorted input audio signals.

In some cases, the analytics server 102 generates simulated training audio signals corresponding to training audio signals having varied features or characteristics (e.g., variations on the speaker's voice characteristics), thereby simulating the various types of degradations on the low-level acoustic features (e.g., MFCCs, LFCCs) and/or variations to the speaker's voice, noise, frequency augmentation, and the like. The analytics server 102 generates an augmented copy dataset corresponding to the training audio signals. When the analytics server 102 applies a data augmentation operation on a particular audio signal, the analytics server 102 generates a corresponding simulated signal as an augmented copy of the particular audio signal. For instance, the analytics server 102 applies the flip signal augmentation functions the training audio signals to generate the simulated training audio signals of the augmented copy data corresponding to the training audio signals. The analytics server 102 stores the augmented copies, containing the simulated signals, in the form of additional training data in the analytics database 104.

The analytics server 102 executes software program functions or machine-learning architecture layers that execute feature extraction functions for the embedding extractor, such as input layers defined by the layers of the machine-learning architecture. The feature extraction functions ingest the input contact data (e.g., call data, audio signal) containing the biometric data associated with the speaking end-user. The input audio signal may include training audio data, enrollment audio data, or inbound audio data, according to the particular operational phase of the machine-learning architecture. The analytics server 102 receives the contact data contains biometric signals (e.g., audio signal with utterances, video signal with images of the speaker's face) from the end-user device 114 or the provider server 106, and extracts various types of features from the contact signals. The feature extraction functions of the embedding extractor may extract various types of low-level acoustic features from the audio signal, which may represent, for example, a speaker's voice features or background audio features. Non-limiting examples of the low-level acoustic features extracted from the audio signals include mel-frequency cepstrum coefficients (MFCCs), linear frequency cepstral coefficients (LFCCs), and the like.

The input layers of the embedding extractor may extract the acoustic features for the particular input voice samples for the speaker. The input layers then feed the extracted acoustic features into the remaining layers of the embedding extractor. Using the acoustic features, the embedding extractor then extracts the speaker-embedding feature vector or speaker voiceprint. The speaker-embedding vector is a mathematical representation of the speaker's speech in the audio signal data of the call data. In operation, the feature extraction functions extract the speaker features from the audio signal, and the analytics server 102 applies the embedding extractor on the speaker features to derive the speaker embedding, where the embedding extractor applies a GMM-based system (e.g., i-vectors) or DNN-based systems (e.g., x-vectors, CNN vectors) on the speaker features.

Embedding Extraction Engine

During training operations of the analytics server 102, the input layers of the machine-learning architecture perform the feature extraction functions on training contact data to extract the biometrics features of an inbound speaker (e.g., caller), such as the low-level acoustic features. The embedding extractor extracts one or more training embedding feature vectors or inbound voiceprint based on the inbound features. In some instances, the analytics server 102 performs the various data augmentation operations on the training data to generate simulated training samples, from which the input layers extract the various features and the embedding extractor then generates the training embedding vector. The analytics server 102 executes programming for generating predicted outputs. The predicted outputs may include, for example, determining the similarity score based upon the distance (e.g., cosine distance), or other algorithm, between the training embeddings and the corresponding expected embeddings indicated by the labels, or determining a likelihood score for one or more predicted classifications of the speaker based upon the distance or correctness of the predicted classification of the speaker compared to expected classifications of the speaker indicated the labels. The predicted outputs may include any number of additional or alternative potential outputs generated by the machine-learning architecture. The loss layers and backpropagation functions of the machine-learning architecture adjust various hyper-parameters, weights, or other aspects of the machine-learning architecture to improve the accuracy and precision of the predicted outputs, until the analytics server 102 determines that the machine-learning architecture satisfies one or more training thresholds.

During the training phase for the machine-learning architecture, the analytics server 102 receives training signals of various lengths and characteristics from one or more corpora, which may be stored in an analytics database 104 or other machine-readable non-transitory storage medium. As an example, the training signals (sometimes referred to as "training samples") include, clean audio signals and simulated audio signals, each of which the analytics server 102 uses to train the various layers of the machine-learning architecture. The clean audio signals are audio samples containing speech in which the speech and the features are identifiable by the analytics server 102. As another example, the training samples include visual data containing images of the speaker's face. The analytics server 102 applies the machine-learning architecture to each of the training samples and generates corresponding training feature vectors (sometimes called "training embeddings") representing the end-user biometrics (e.g., speaker's voice, facial features).

The analytics server 102 may retrieve the simulated audio signals from the more analytics databases 104 and/or generate the simulated audio signals by performing various data augmentation operations. In some cases, the data augmentation operations may generate a simulated audio signal for a given input audio signal (e.g., training signal, enrollment signal), in which the simulated audio signal contains manipulated features of the input audio signal mimicking the effects a particular type of signal degradation or distortion on the input audio signal. The analytics server 102 stores the training audio signals into the non-transitory medium of the analytics server 102 and/or the analytics database 104 for future reference or operations of the machine-learning architecture. One or more fully connected layers, feed-forward layers, classifier layers, or the like, may generate one or more training phase predicted outputs (e.g., predicted vectors, predict language, predicted speaker, predicted face). Loss layers of the machine-learning architecture perform various loss functions to calculate and evaluate the distances between the predicated outputs and corresponding expected outputs, as indicated by training labels associated with the training signal data. The loss layers (or other functions executed by the analytics server 102) adjust or tune the hyper-parameters of the machine-learning architecture until the distance between the predicted outputs and the expected outputs satisfies a training threshold value. The analytics server 102 determines that the machine-learning architecture is successfully trained in response to the analytics server 102 determining that the distance between the predicted outputs and the expected outputs satisfies the training threshold.

During enrollment operations of the analytics server 102 or provider server 111, the analytics server 102 or provider server 111 registers the new speaker and enrolls the speaker's information and biometric data. The analytics server 102 places the machine-learning architecture in the enrollment phase, and the input layers embedding extractor extracts the speaker features and the speaker-embedding vector to enroll the speaker or, in some cases, to compare against a stored enrolled voiceprint embedding of an enrolled speaker. In some cases during registration, the embedding extractor extracts multiple enrollment speaker embeddings for multiple enrollment samples, which the analytics server 102 then algorithmically combines to generate the enrolled voiceprint for the particular speaker.

An enrollee-speaker, such as an end-user consumer of the provider system 110, provides (to the analytics system 101) a number of enrollment audio signals containing examples of the enrollee's speech. As an example, the enrollee could respond to various interactive voice response (IVR) prompts of IVR software executed by a provider server 111 via a telephony channel. As another example, the enrollee could respond to various prompts generated by the provider server 111 and exchanged with a software application of the edge device 114d via a corresponding data communications channel. The provider server 111 then forwards the recorded responses containing bona fide enrollment sample data (e.g., enrollment audio signals, enrollment images signals) to the analytics server 102. The analytics server 102 applies the trained machine-learning architecture to each of the enrollee samples and generates corresponding enrollee feature vectors (sometimes called "enrollee embeddings"), though the analytics server 102 disables certain layers, such as layers employed for training the machine-learning architecture. The analytics server 102 generates an average or otherwise algorithmically combines the enrollee feature vectors and stores the enrollee feature vectors into the analytics database 104 or the provider database 112. Optionally, the edge device generates the enrollee feature vectors by locally applying (on-device) the trained machine-learning architecture to each of the enrollee audio samples and then sends the enrollee feature vectors to the provider service 111 or analytics server 102.

During deployment operations of the analytics server 102, the input layers of the trained machine-learning architecture perform the feature extraction functions on inbound contact data to extract the biometrics features of an inbound speaker (e.g., caller), such as the low-level acoustic features. The embedding extractor extracts one or more inbound embedding feature vectors or inbound voiceprint based on the inbound features. In some instances, the analytics server 102 algorithmically combines (e.g., averages, concatenates, convolves) one or more inbound feature vectors (as extracted from the inbound contact data) to generate the one or more inbound embeddings. The analytics server 102 executes programming for determining similarity scores based upon a distance (e.g., cosine distance), or other algorithm, between the inbound embeddings and the corresponding expected embeddings or enrolled embeddings.

The analytics server 102 stores the trained machine-learning architecture and the speaker embeddings into the analytics database 104 or provider database 112. In some cases, the analytics server 102 receives instructions to enter the enrollment phase from another device of the system 100 (e.g., a provider server 111, agent device 113, admin device 103, end-user device 114). The analytics server 102 retrieves the trained embedding extractor of the trained machine-learning architecture from the database 104, 112, and applies the embedding extractor on one or more enrollee audio signals to extract the enrollment features and the enrollment embeddings (e.g., enrollment feature vectors, enrollment speaker embeddings, enrolled voiceprint) for the enrollee audio signals. The analytics server 102 then stores the extracted enrollment embeddings and the trained machine-learning architecture into the database 104, 112 for the deployment phase.

In the deployment phase (sometimes referred to as "testing" or "inference") of the machine-learning architecture, the analytics server 102 receives the inbound contact data (e.g., inbound audio data, inbound image data) of an inbound speaker through a particular communications channel. The analytics server 102 applies the trained embedding extractor of the machine-learning architecture on the inbound audio signal to extract the inbound features and inbound embeddings (e.g., inbound feature vectors, inbound speaker embeddings, inbound voiceprint) from the inbound audio signal and determine whether the speaker is an enrollee (e.g., enrolled-speaker, enrolled-user, enrolled face) who is enrolled with the provider system 110 or the analytics system 101. The machine-learning architecture determines the similarity score (or speaker verification score) for the inbound audio data based upon the distance (e.g., cosine distance), or other algorithm, between the inbound embedding and the corresponding enrolled embeddings or other speaker embedding. The machine-learning architecture determines the inbound speaker is the enrolled speaker when, for example, the similarity score satisfies a speaker-recognition threshold value.

In some embodiments, during or following the deployment phase, the analytics server 102 or another device of the system 100 (e.g., provider server 111) executes any number of downstream operations using the outputs of the embedding extractor or the machine-learning architecture. These downstream operations employ the extracted inbound voiceprint embedding, as generated by the embedding extractor or other functional engines of the machine-learning architecture executed during the deployment phase.

Similar details of the training and enrollment phases for the speaker verification machine-learning architecture have been described in U.S. Application Nos. U.S. application Ser. Nos. 16/992,789, 17/231,672, and 17/491,292, each of which is incorporated by reference. In addition, the machine-learning architectures described herein may further include the layers of a speaker verification machine-learning, where the analytics server 102 (or other device of the system 100) executes the layers of the speaker verification machine-learning downstream from or in conjunction with the layers for language classification and language compensation.

Cross-Lingual Compensation and Language Engine

The machine-learning architecture includes various layers and functions performing for cross-lingual compensation to compensate for differences between languages spoken by users, such as differences between an enrollee's spoken language during enrollment and an inbound speaker's language during deployment, where the inbound speaker purports to be the enrolled speaker but uses a different language. In some embodiments, such layers and functions define a language engine of the machine-learning architecture. The machine-learning architecture (or other software programming of the analytics server 102) performs one or more cross-lingual compensation functions to improve speaker-recognition perform of the machine-learning architecture. These cross-lingual compensation functions include, for example, cross-lingual score-calibration, cross-lingual model fine-tuning, and flip signal augmentation, among others.

For cross-lingual score-calibration, the language engine of the machine-learning architecture includes a multi-class language classifier trained for language classification according to various machine-learning techniques (e.g., LDA, SVM). In some implementations, the analytics server 102 further trains the language classifier for classifying a speaker gender or other types of speaker attributes. The analytics server 102 uses the outputted scores generated by the language engine for training or tuning (e.g., retraining, fine-tuning) the other layers of the machine-learning architecture, such as the layers of the embedding extractor. The loss layers and backpropagation functions of the machine-learning architecture reference the outputs of the language classifier to adjust the hyper-parameters or weights of the machine-learning architecture. In this way, the outputs of the language engine enable the machine-learning architecture to compensate and control for varied languages across audio samples when, for example, extracting the speaker embeddings.

The training data corpus includes any number (e.g., hundreds or thousands) of audio signals containing utterances in any number (N) of languages (e.g., English, Chinese, Spanish) for any number of speakers. The analytics server 102 trains the language classifier to generate soft outputs, rather than hard decisions representing more definitive or absolute probability values. Each soft output value indicates a language likelihood score, representing the predicted language spoken by the speaker who originated the particular utterance of an input audio signal (e.g., training audio signal, enrollment audio signal, inbound audio signal).

In operation, the embedding extractor or other layers of the machine-learning architecture extract the acoustic features and speaker embeddings of the particular input audio signal. The language engine ingests the speaker embedding and the language classifier determines the language likelihood score using the speaker embedding.

To train the language classifier, the analytics server 102 feeds training samples (e.g., training signals, training embeddings) to the language engine. The training embeddings represent instances in which a speaker spoke in one or more languages. In some cases, the training signal for a speaker includes utterances of different languages, as reflected in the one or more training embeddings for that particular speaker. The analytics server 102 trains the language classifier according to various supervised or semi-supervised techniques, executing loss layers and back propagation functions to determine the accuracy or precision of predicted outputs (e.g., predicted classifications) against expected outputs (e.g., expected classifications) indicated by training labels associated with the particular training samples. In training or tuning the language classifier, loss layers of the machine-learning architecture determine the accuracy and distance for predicted outputs based on the difference or similarity between the enrolled embeddings or enrolled voiceprint for enrolled signals compared against the training embeddings or training voiceprint for the training audio signals.

During the deployment phase, the analytics server 102 applies the trained language classifier on an inbound audio signal and outputs one or more language likelihood scores for the inbound speaker. The analytics server 102 applies the language classifier on one or more enrollment embeddings or enrollment voiceprint for one or more enrollment signals, and applies the language classifier on one or more inbound embeddings or inbound voiceprint for the inbound signal. The language classifier generates the language likelihood scores as soft outputs for the enrollment signal and inbound signal.

As an example involving two languages (e.g., English, Spanish), the analytics server 102 trains the language classifier to classify the language(s) spoken in a particular audio signal. In training, the language classifier establishes and fixes an expected, central, or average vector or value representing the particular language. The language classifier outputs the language likelihood score as the soft output based upon, for example, a distance between a predicted input value and the expected value. During deployment, the analytics server 102 generates language likelihood scores for the enrollment signals and the inbound signal, where the analytics server 102 generates the language likelihood for each language. Continuing with the example, the analytics server 102 generates four language likelihood scores: an English language likelihood score for the enrollment signal, a Spanish language likelihood score for the enrollment signal, an English language likelihood score for the inbound signal, and a Spanish language likelihood score for the inbound signal. In some cases, the enrollment and/or inbound signal includes multiple languages. In such cases, the analytics server 102 averages the language likelihood scores of the particular enrollment or inbound signal.

Using the classifier outputs, the analytics server 102 computes a cross-lingual quality measure ($Q_{CL}$) (sometimes referred to as "quality measure"). In training or deployment, the analytics server 102 may generate the quality measure for each trial, where the "trial" constitutes a pair of an enrolled voice or enrolled voiceprint of an enrolled speaker's voice, paired with an inbound voice or inbound voiceprint of the inbound speaker's voice. For each language expected in the audio signals, the language classifier computes a soft output value indicating the language likelihood score for the enrollment voiceprint ($v_i^e$) and for the inbound voiceprint ($v_i^t$), thereby resulting in the language classifier generating two language likelihood scores per language (2N-language likelihood scores). The analytics server 102 calculates the quality measure as the sum of an absolute value of a difference between the enrollment and test language likelihood scores, represented as: $Q_{CL} = \Sigma_{i=1}^{2N} |(v_i^e - v_i^t)|$, as an example. If the enrollment and test signals contain utterances from the same language, then the quality measure ($Q_{CL}$) is relatively or comparatively small; but if the enrollment and test utterances are from different languages, then the quality measure ($Q_{CL}$) is relatively or comparatively large.

For instance, for an enrollment signal including English and an inbound signal including Spanish, the language classifier computes the language likelihood scores indicating, for example, whether the enrollment and inbound signals include more spoken English or more spoken Spanish. The training labels, stored enrollment data, or an administrative user's input indicates the number of expected languages (2) amongst the audio signals. For each of the expected languages (English, Spanish), the language engine calculates the language likelihood scores of the enrollment and input voiceprints. With the two expected languages, English and Spanish, then the language engine calculates two language likelihood scores for the enrollment voiceprint (e.g., likelihood utterance is in English, likelihood utterance is in Spanish) and two language likelihood scores for the input voiceprint (e.g., likelihood utterance is in English, likelihood utterance is in Spanish). The language engine then computes the difference of these language likelihood scores, and sums the absolute values of these differences between the language likelihood scores. For each pair (or trial) of enrollment-side language likelihood score and input-side language likelihood score, the analytics server 102 determines a distance between the particular pair of language likelihood scores, then takes the absolute value of that distance. The analytics server 102 then sums each of these distances to determine the quality measure. A smaller quality measure indicates that the enrollment signal and input signal are from the same language, where as a larger quality indicates that the enrollment signal and input signal are from different languages.

In some embodiments, the analytics server 102 adjusts a similarity score using the quality measure, thereby compensating for variance or mismatches in the language or for discrepancies in the machine-learning architecture when the enrollee uses various different languages. The analytics server 102 may adjust the verification score according to any number of algorithmic functions. For instance, the analytics server 102 may simply subtract or add the quality measure with the similarity score. In some embodiments, the analytics server 102 updates training (e.g., re-trains, tunes) various layers, hyper-parameters, or weights of the embedding extractor or other aspects of the machine-learning architecture according to a loss function (e.g., LDA) or other machine-learning techniques (e.g., logistic regression) using the quality measure.

For cross-lingual fine-tuning, the analytics server 102 fine-tunes the embedding extractor to account for speakers associated with multilingual utterances (e.g., audio signals in which the speaker switches languages, and/or distinct audio signals in which a same speaker uses different languages throughout). Within the training dataset comprising the training audio signals, a subset of the training audio signals includes multi-lingual utterances of a speaker in the training signal. The training labels of the training audio signals indicate the one or more languages in the particular training audio signal and, in some cases, indicate an identity indicator for the training speaker. The analytics server 102 references the training labels to select the subset of training audio signals, training embeddings for each training audio signal in which the speaker switches languages, and/or training embeddings for training audio signals in which a same speaker uses different languages across the training audio signals. In some cases, the analytics server 102 references the training labels of the subset of training audio signals to determine the particular training speaker having multiple languages. For example, for a collection of 10,000 training audio signals containing Chinese utterances spoken by 500 training speakers, where 250 of those training speakers spoke in a subset of 2,000 training audio signals containing multilingual utterances of Chinese and English (e.g., audio signals in which the speaker speaks Chinese and English, and/or distinct audio signals in which a same speaker uses Chinese in some audio signals and English in other audio signals). The analytics server 102 selects the subset of 2,000 training audio signals to fine-tune the embedding extractor, classification engine, or other aspects of the machine-learning architecture.

The analytics server 102 applies the embedding extractor (or other aspect of the machine-learning architecture) on the subset of training embeddings to update the training (fine tune) of the embedding extractor. As before, the embedding extractor generates predicted embeddings and the loss layers tune the hyper-parameters or weights of the embedding extractor based upon a distance between the predicted embedding produced for a particular training signal and an expected embedding, as indicated by the training label of the particular training signal. In some embodiments, the analytics server 102 applies one or more data augmentation operations (e.g., flip signal augmentation) on the training signals in the subset of training signals for retraining or fine-tuning.

Flip Signal Augmentation

In some implementations, the data augmentation operations include flip signal augmentation. The analytics server 102 applies the flip signal augmentation operation on the training signals or enrollment signals to simulate a different language. In flip signal augmentation, the data augmentation layers of the machine-learning architecture or the analytics server 102 reverses the audio signal along the time dimension (e.g., playback audio in reverse). Reversing the signal in the time domain still preserves the speaker's voice-feature information of the speech, but reverses modulations or features on the time, frequency, and energy spectrums. In this way, the flip signal augmentation simulates an utterance from a speaker using a different language from the same speaker's training samples in the training data. During the training or the enrollment phases, the analytics server 102 applies the flip signal augmentation operation on the corresponding input audio sample (e.g., training sample, enrollment sample).

Additionally or alternatively, the analytics server 102 reverses the low-level acoustic features (e.g., MFCCs) extracted from the input audio signal (e.g., training signal, enrollment signal), the analytics server 102 reverses the acoustic signals along the time domain or other domain. As an example, for each enrollment utterance of an enrollment signal, the embedding extractor extracts a speaker enrollment embedding for the original input signal (using the original MFCC features) and an augmented enrollment embedding for the augmented input signal (using the time-reversed MFCC features). The embedding extractor algorithmically combines (e.g., calculates an average, appends) the extracted enrollment embeddings to obtain the enrolled voiceprint embedding for the particular enrolled speaker.

As an example, for each training audio signal of a particular training speaker or enrollment audio signal of a particular enrolled speaker, the analytics server 102 extracts a speaker embedding for the original input audio signal (e.g., training signal or enrollment signal) and another speaker embedding for the simulated signal (e.g., simulated training signal, simulated enrollment signal) having the time-reversed low-level acoustic features. The analytics server 102 algorithmically combines (e.g., averages, appends) the original speaker embeddings and simulated speaker embeddings to extract a speaker embedding or voiceprint. In some cases, the analytics server 102 may apply the flip signal augmentation operations on inbound or test audio signals during a deployment phase or when tuning (e.g., fine-tuning, retraining) one or more layers of the machine-learning architecture.

The flip signal augmentation need not be limited to training or enrollment phases. Additionally or alternatively, the analytics server 102 applies the flip signal augmentation to the inbound audio signal data during the deployment phase. In this way, the flip signal augmentation helps the machine-learning architecture with compensating for language variation in cross-lingual instances of the analytics server 102 applying the machine-learning architecture to instances of input contact data.

The analytics database 104 may contain any number of corpora of training signals (e.g., audio signals, video signals) that are accessible to the analytics server 102 over internal networks or external networks 105. In some implementations, the analytics server 102 employs supervised training to train the machine-learning architecture, where the analytics database 104 includes training labels associated with the training signals that indicate, for example, the characteristics (e.g., speaker language) or features (e.g., MFCCs, facial features) of the training signals. Other implementations may employ other types of training techniques, including unsupervised or semi-supervised training, such as clustering. Additionally or alternatively, the analytics server 102 may query a provider database 112 or an external third-party database (not shown) to access a corpus of one or more training signals. In some cases, an administrator of the analytics system 101 or provider system 110 may configure the analytics server 102 to select the training signals having certain features or characteristics.

In some embodiments, the training audio data includes various types of signal data and labels configured for training or tuning (e.g., retraining or fine-tuning) the language classifier, language engine, or other layers of the machine-learning architecture (e.g., embedding extractor). The training audio data includes, for example, language-match and positive speaker match (LM$^+$) audio data; language non-match and positive speaker match (LNM$^+$) audio data; language-match and negative speaker match (LM$^-$) audio data; and language non-match and negative speaker match (LNM$^-$) audio data. The training labels associated with the training audio data indicates the expected speaker identity and the expected language.

The admin device 103 of the call analytics system 101 is a computing device allowing personnel of the call analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the analytics system 101 (e.g., analytics server 102) or components of the provider system 110 (e.g., provider server 111), and operates the admin device 103 to issue queries and commands to such components (e.g., analytics server 102, provider server 111).

Turning to the provider systems 110, a provider system 110 includes provider servers 111, provider databases 112, and agent devices 116.

The provider server 111 of the service provider system 110 executes software processes for managing a call queue and/or routing calls made to the provider system 110 through the various channels, where the processes may include, for example, routing calls to the appropriate agent devices 116 based on the inbound speaker's comments, instructions, IVR inputs, or other inputs submitted during the inbound call. The provider server 111 can capture, query, or generate various types of information about the call, the speaker, and/or the end-user device 114 and forward the information to the agent device 116, where a graphical user interface (GUI) of the agent device 116 displays the information to the an agent of the provider system 110 (e.g., call center agent). The provider server 111 also transmits the information about the inbound call to the analytics system 101 to perform various analytics processes on the inbound audio signal and any other audio data. The provider server 111 may transmit the information and the audio data based upon preconfigured triggering conditions (e.g., receiving the inbound phone call), instructions or queries received from another device of the system 100 (e.g., agent device 116, admin device 103, analytics server 102), or as part of a batch transmitted at a regular interval or predetermined time.

The provider database 112 may contain any number of corpora of training signals (e.g., audio signals, video signals) that are accessible to the provider server 111 or analytics server 102 over internal networks or external networks 105. Additionally or alternatively, the provider database 112 include various types of enrollment data or speaker information that the analytics server 102 references when performing the various analytics operations or executing the operations of the machine-learning architecture.

The system 100 may include any number databases 104, 112 hosted by any number of computing devices having comprising non-transitory machine-readable storage and processors configured host and query various types data records, and capable of performing the various tasks and processes described herein. For example, the analytics server 102 may host or be in communication with the analytics database 104, and the provider server 111 may host or be in communication with the provider database 114, where the databases 104, 112 may receive and stored the various types of contact data and user registration or enrollment data. In some embodiments, the analytics databases 104 and/or the provider databases 112 may contain any number of corpora of training audio signals that are accessible to the analytics server 102. In some embodiments, the analytics server 102 employs supervised training to train the machine-learning architecture, where the analytics database 104 or provider database 112 includes labels or label-related information associated with the training audio signals that indicate which signals contain speech portions, languages, speaker identities, or expected features or embeddings. The analytics server 102 may also query an external database (not shown) to access a third-party corpus of training audio signals. In some implementations, the analytics database 104 and/or the provider database 111 may contain the various enrollment contact data, extracted features, and extracted embeddings generated by the identification server 102 during an enrollment operation for the user.

The agent device 116 of the provider system 110 may allow agents or other users of the provider system 110 to configure operations of devices of the provider system 110. For calls made to the provider system 110, the agent device 116 receives and displays some or all of the relevant information associated with the call routed from the provider server 111. The analytics server 102 or the provider server 111 may present outputted results generated by the analytics server 102, such as a verification score, allowing the agent to determine how to handle a particular inbound call.

Figure 2:
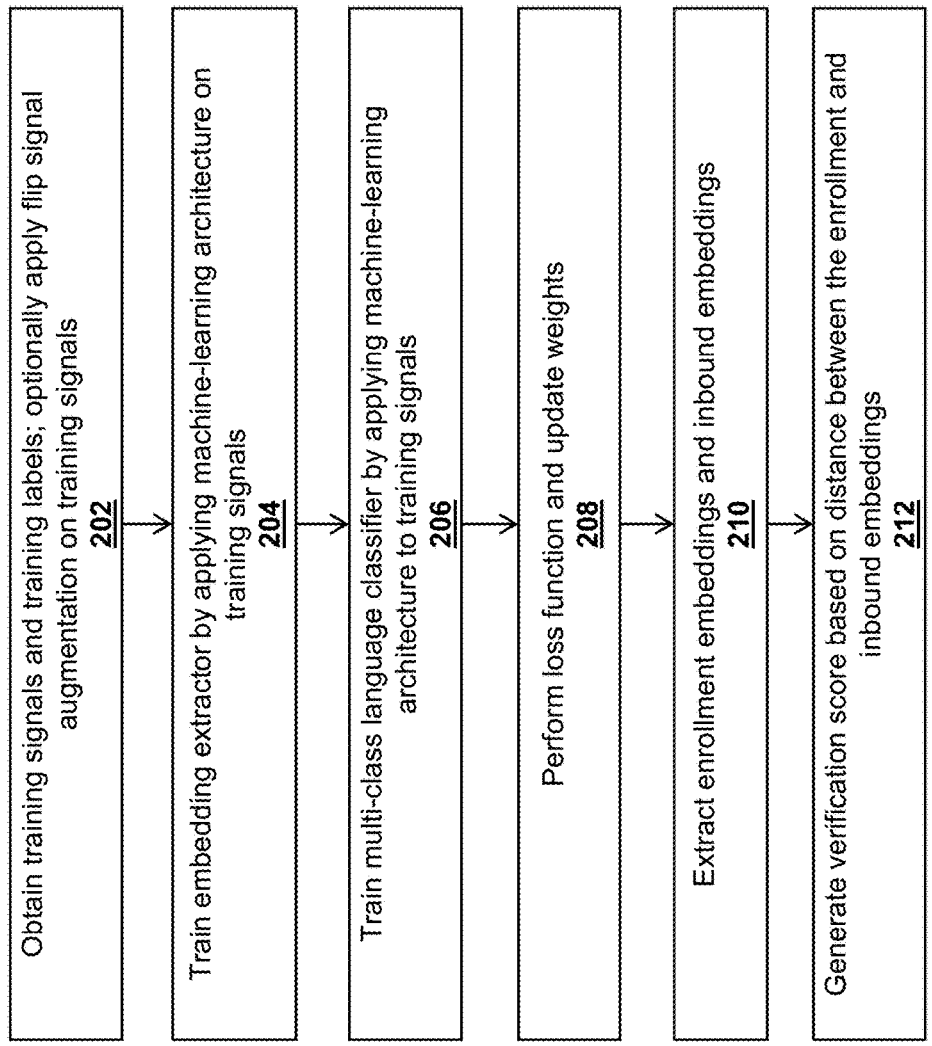
FIG. 2 shows steps of a method for training and deploying a machine-learning architecture for extracting speaker embeddings and compensating for language variance, according to an embodiment.

FIG. 2 shows steps of a method 200 for training and deploying a machine-learning architecture for extracting speaker embeddings and compensating for language variance. A server (e.g., analytics server 102) performs the steps of the method 200 by executing machine-readable software code that includes one or more machine-learning architectures, though embodiments may include any number of computing devices or any type of computing device that perform the various operations of the method 200. Embodiments may include additional, fewer, or different operations than those described in the method 200.

The server executes the machine-learning architecture comprising layers or functions defining an embedding extractor and a language engine containing a multi-class language classifier, among other potential sub-component engines, layers, or functions of the machine-learning architecture. In some embodiments, the machine-learning architecture constitutes multiple, distinct machine-learning architectures. In some embodiments, the machine-learning architecture includes a single machine-learning architecture. For ease of description, the machine-learning architecture of the method 200 constitutes the single machine-learning architecture. The server executes the software routines of the layers and functions of the machine-learning architecture in various operational phases, including a training phase, a deployment phase (sometimes referred to as the "testing phase" or "production phase"), and an optional enrollment phase (not shown in the example method 200).

The server ingests and applies the machine-learning architecture on one or more input audio signals, in accordance with the particular operational phase. The input audio signal refers to any audio signal that the server ingests and applies the machine-learning architecture on, including training signals during the training phase, enrollment signals received during the enrollment phase, and inbound audio signals received during the deployment phase.

In step 202, the server obtains training signals and training labels. During the training phase, the server obtains any number of training audio signals and associated training labels corresponding to the training signals. The server places the machine-learning architecture into a training operational phase and the server obtains any number (sometimes thousands or hundreds of thousands) of training audio signals.

The server or input layers of the machine-learning architecture perform various pre-processing operations on an input audio signal (e.g., training audio signal, enrollment audio signal, inbound audio signal). These pre-processing operations may include, for example, extracting low-level acoustic features (e.g., MFCCs, LFCCs) from the audio signals and transforming these features from a time-domain representation into a frequency-domain representation by performing FFT and/or SFT transform operations. The pre-processing operations may also include parsing the audio signals into frames or sub-frames, and performing various normalization or scaling operations. In some implementations, the server performs any number of pre-processing operations prior to feeding the audio data of the input audio signal into the input layers of the machine-learning architecture. The server may perform the various pre-processing operations in one or more of the operational phases, though the particular pre-processing operations performed may vary across the operational phases. Additionally or alternatively, the server may perform various pre-processing operations separately from the machine-learning architecture or as an in-network layer of the machine-learning architecture.

In some embodiments, the server or layers of the machine-learning architecture perform various data augmentation operations on the input audio signal (e.g., training audio signal, enrollment audio signal). The data augmentation operations generate various types of distortion or degradation of the input audio signal, such that the operational layers of the machine-learning architecture (e.g., embedding extractor; language classifier) ingest the resulting augmented or distorted input audio signals. In some cases, the server generates simulated training audio signals corresponding to training audio signals having varied features or characteristics (e.g., variations on the speaker's voice characteristics), simulating various types of degradations on the low-level features and/or variations to the speaker's voice, noise, frequency augmentation, and the like. The server generates an augmented copy dataset corresponding to the training audio signals. When the server applies a data augmentation operation on a particular audio signal, the server generates a corresponding simulated signal as an augmented copy of the particular audio signal. For instance, the server applies the flip signal augmentation functions the training audio signals to generate the simulated training audio signals of the augmented copy data corresponding to the training audio signals.

Optionally, in some embodiments, the server applies a flip signal augmentation operation on the training signals or enrollment signals. The server performs flip signal augmentation of the training samples by reversing the audio signal along the time dimension, simulating a different language utterance from the same speaker in the audio signals. In some implementations, the server reverse the low-level acoustic features (e.g., MFCCs, LFCCs) of the particular audio signal along the domain, thereby generating the simulated features of the simulated signal for the corresponding audio signal. As an example, for each training audio signal of a particular training speaker or enrollment audio signal of a particular enrolled speaker, the server extracts a speaker embedding for the original input audio signal (e.g., training signal or enrollment signal) and another speaker embedding for the simulated signal (e.g., simulated training signal, simulated enrollment signal) having the time-reversed low-level acoustic features. The server algorithmically combines (e.g., averages, appends) the original speaker embeddings and simulated speaker embeddings to extract a speaker embedding or voiceprint.

In some embodiments, the server may apply the flip signal augmentation operations on inbound or test audio signals during a deployment phase or when tuning (e.g., fine-tuning, re-training) one or more layers of the machine-learning architecture.

The server may perform the various data augmentation operations separate from the machine-learning architecture or as operations of in-network augmentation layers of the machine-learning architecture. Moreover, the server may perform the various data augmentation operations in one or more of the operational phases (e.g., training phase), though the particular augmentation operations performed may vary across each of the operational phases.

In step 204, the server trains layers of the machine-learning architecture defining the embedding extractor by applying the embedding extractor on the training signals and training labels. For each training signal (including any simulated training signals), the embedding extractor generates a predicted training embedding for speech audio in the particular training signal.

In step 206, the server trains layers of the machine-learning architecture defining the language classifier by applying the language classifier on the same or different training signals and training labels. For each of the training signals, the language classifier generates one or more predicted languages in the speech audio in the particular training signal.

In step 208, the server executes a loss function of the machine-learning architecture and updates hyper-parameters or weights of the machine-learning architecture. The server executes software routines of one or more loss layers that perform loss functions and update hyper-parameters and/or weights of the machine-learning architecture. In some embodiments, each of the sub-component engines (e.g., embedding extractor, language classifier) comprises distinct loss layers, which separately train the particular sub-component engine. In some embodiments, the machine-learning architecture includes fused loss layers that collectively train the sub-component engines (e.g., embedding extractor, language classifier).

For the embedding extractor, the loss layers perform loss functions that evaluate a level of error by referencing the training labels associated with the training signals, where the training labels indicate expected extractor outputs (e.g., expected training features, expected training vectors) for the corresponding training signal. The training labels include various information indicating, for example, the values or features of the expected extractor outputs. The various loss functions (e.g., means-square error loss function) determine the level of error based upon differences or similarities between a predicted extractor output (e.g., predicted training features, predicted training vectors) generated by the embedding extractor and the expected extractor output indicated by the corresponding training label. The loss layers of the embedding extractor may adjust the hyper-parameters of the embedding extractor to improve the level of error until the level of error satisfies a threshold level of error.

For the language classifier, the loss layers perform loss functions that evaluate a level of error by referencing the training labels associated with the training signals, where the training labels indicate expected language outputs for the corresponding training signal. The training labels indicate the expected languages present in the training audio signal. The various loss functions determine the level of error based upon differences or similarities between a predicted language(s) or soft output value representing a predicted likely language(s) generated by the language classifier and the expected language output indicated by the corresponding training label. The loss layers of the language classifier may adjust the hyper-parameters of the language classifier to improve the level of error until the level of error satisfies a threshold level of error.

When training is completed, the server stores the hyper-parameters into non-transitory memory of the server or other memory storage location (e.g., analytics database, provider database). After training, the server may fix the hyper-parameters and/or weights of the machine-learning architecture by disabling certain layers or functions of the machine-learning architecture, thereby keeping the hyper-parameters and/or weights unchanged.

In step 210, the server extracts one or more enrollment embeddings and enrollment voiceprint by applying the trained embedding extractor on one or more enrollment signals during the enrollment operational phase. The server receives the enrollment signals for enrolling an enrolled user or for updating enrollment features or enrollment voiceprint for the enrolled user. During the deployment operational phase, the server extracts one or more inbound embeddings and inbound voiceprint by applying the trained embedding extractor on one or more inbound signals.

In step 212, the server generates a similarity score (sometimes referred to as a verification score or the like) based on a distance between the enrolled voiceprint and the inbound voiceprint. The embedding extractor or other layers of the machine-learning architecture determine the distance (e.g., cosine distance) based upon comparing the inbound speaker voiceprint against the stored enrolled voiceprint embedding. The embedding extractor may then determine whether the inbound speaker voiceprint satisfies a voice-match or verification threshold score.

In some embodiments, the server (or another computing device) executes downstream operations using the extracted inbound voiceprint embedding and/or the similarity score. For example, an authentication routine may determine the likelihood of fraud or likelihood that the speaker is an enrolled speaker. As described further below, in some embodiments the server adjusts the similarity score according to a cross-lingual quality measure.

Figure 3:
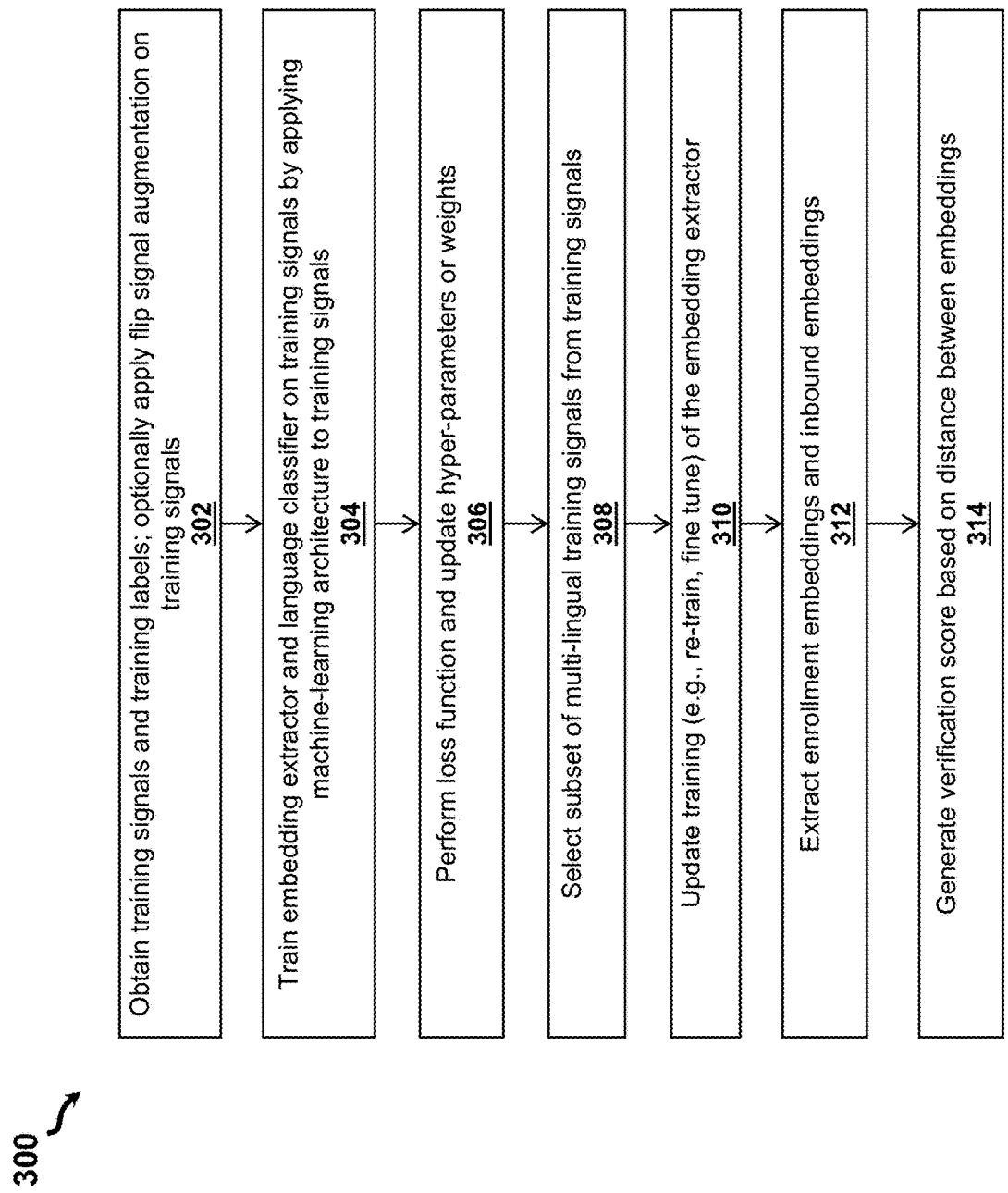
FIG. 3 shows steps of a method for training and deploying a machine-learning architecture for extracting speaker embeddings and compensating for language variance, according to an embodiment.

FIG. 3 shows steps of a method 300 for training and deploying a machine-learning architecture for extracting speaker embeddings and compensating for language variance. A server (e.g., analytics server 102) performs the steps of the method 300 by executing machine-readable software code that includes one or more machine-learning architectures, though embodiments may include any number of computing devices or any type of computing device that perform the various operations of the method 300. Embodiments may include additional, fewer, or different operations than those described in the method 300.

The server executes the machine-learning architecture comprising layers or functions defining an embedding extractor and a language engine containing a multi-class language classifier, among other potential sub-component engines, layers, or functions of the machine-learning architecture. In some embodiments, the machine-learning architecture constitutes multiple, distinct machine-learning architectures. In some embodiments, the machine-learning architecture includes a single machine-learning architecture. For ease of description, the machine-learning architecture of the method 300 constitutes the single machine-learning architecture. The server executes the software routines of the layers and functions of the machine-learning architecture in various operational phases, including a training phase, a deployment phase (sometimes referred to as the "testing phase" or "production phase"), and an optional enrollment phase (not shown in the example method 300).

The server ingests and applies the machine-learning architecture on one or more input audio signals, in accordance with the particular operational phase. The input audio signal refers to any audio signal that the server ingests and applies the machine-learning architecture on, including training signals during the training phase, enrollment signals received during the enrollment phase, and inbound audio signals received during the deployment phase.

In step 302, the server obtains training signals and training labels. During the training phase, the server obtains any number of training audio signals and associated training labels corresponding to the training signals. The server places the machine-learning architecture into a training operational phase and the server obtains any number (sometimes thousands or hundreds of thousands) of training audio signals.

The server or input layers of the machine-learning architecture perform various pre-processing operations on an input audio signal (e.g., training audio signal, enrollment audio signal, inbound audio signal). These pre-processing operations may include, for example, extracting low-level acoustic features (e.g., MFCCs, LFCCs) from the audio signals and transforming these features from a time-domain representation into a frequency-domain representation by performing FFT and/or SFT transform operations. The pre-processing operations may also include parsing the audio signals into frames or sub-frames, and performing various normalization or scaling operations. In some implementations, the server performs any number of pre-processing operations prior to feeding the audio data of the input audio signal into the input layers of the machine-learning architecture. The server may perform the various pre-processing operations in one or more of the operational phases, though the particular pre-processing operations performed may vary across the operational phases. Additionally or alternatively, the server may perform various pre-processing operations separately from the machine-learning architecture or as an in-network layer of the machine-learning architecture.

In some embodiments, the server or layers of the machine-learning architecture perform various data augmentation operations on the input audio signal (e.g., training audio signal, enrollment audio signal). The data augmentation operations generate various types of distortion or degradation of the input audio signal, such that the operational layers of the machine-learning architecture (e.g., embedding extractor; language classifier) ingest the resulting augmented or distorted input audio signals. In some cases, the server generates simulated training audio signals corresponding to training audio signals having varied features or characteristics (e.g., variations on the speaker's voice characteristics), simulating various types of degradations on the low-level features and/or variations to the speaker's voice, noise, frequency augmentation, and the like. The server generates an augmented copy dataset corresponding to the training audio signals. When the server applies a data augmentation operation on a particular audio signal, the server generates a corresponding simulated signal as an augmented copy of the particular audio signal. For instance, the server applies the flip signal augmentation functions the training audio signals to generate the simulated training audio signals of the augmented copy data corresponding to the training audio signals.

Optionally, in some embodiments, the server applies a flip signal augmentation operation on the training signals or enrollment signals. The server performs flip signal augmentation of the training samples by reversing the audio signal along the time dimension, simulating a different language utterance from the same speaker in the audio signals. In some implementations, the server reverse the low-level acoustic features (e.g., MFCCs, LFCCs) of the particular audio signal along the domain, thereby generating the simulated features of the simulated signal for the corresponding audio signal. As an example, for each training audio signal of a particular training speaker or enrollment audio signal of a particular enrolled speaker, the server extracts a speaker embedding for the original input audio signal (e.g., training signal or enrollment signal) and another speaker embedding for the simulated signal (e.g., simulated training signal, simulated enrollment signal) having the time-reversed low-level acoustic features. The server algorithmically combines (e.g., averages, appends) the original speaker embeddings and simulated speaker embeddings to extract a speaker embedding or voiceprint.

In some embodiments, the server may apply the flip signal augmentation operations on inbound or test audio signals during a deployment phase or when tuning (e.g., fine-tuning, re-training) one or more layers of the machine-learning architecture.

The server may perform the various data augmentation operations separate from the machine-learning architecture or as operations of in-network augmentation layers of the machine-learning architecture. Moreover, the server may perform the various data augmentation operations in one or more of the operational phases (e.g., training phase), though the particular augmentation operations performed may vary across each of the operational phases.

In step 304, the server trains embedding extractor and language classifier on training signals by applying machine-learning architecture to training signals. The server trains layers of the machine-learning architecture defining the embedding extractor by applying the embedding extractor on the training signals and training labels. For each training signal (including any simulated training signals), the embedding extractor generates a predicted training embedding for speech audio in the particular training signal.

Similarly, the server trains layers of the machine-learning architecture defining the language classifier by applying the language classifier on the same or different training signals and training labels. For each of the training signals, the language classifier generates one or more predicted languages in the speech audio in the particular training signal.

In step 306, the server performs loss function and update hyper-parameters and/or weights of the embedding extractor and/or language classifier. The server executes a loss function of the machine-learning architecture and updates hyper-parameters or weights of the machine-learning architecture. The server executes software routines of one or more loss layers that perform loss functions and update hyper-parameters and/or weights of the machine-learning architecture. In some embodiments, each of the sub-component engines (e.g., embedding extractor, language classifier) comprises distinct loss layers, which separately train the particular sub-component engine. In some embodiments, the machine-learning architecture includes fused loss layers that collectively train the sub-component engines (e.g., embedding extractor, language classifier). The operations in the current step 306 are similar those described in step 208 and need not repeat certain details.

In step 308, the server selects a subset of multi-lingual training signals from training signals. In the collection training audio signals, a subset of the training audio signals include multi-lingual utterances of a speaker in the training signal. The training labels of the training audio signals indicate the one or more languages in the particular training audio signal and, in some cases, indicates an identity indicator for the training speaker. The server references the training labels to select the subset of training audio signals having multiple languages. In some cases, the server further references the training labels of the subset of training audio signals to determine the particular training speaker having multiple languages.

In step 310, the server updates the training (e.g., re-train, fine tune) of the embedding extractor or other aspects of the machine-learning architecture using the subset of the training audio signals having multi-language utterances. For example, for a collection of 10,000 training audio signals containing Chinese utterances spoken by 500 training speakers, where 250 of those training speakers spoke in a subset of 2,000 training audio signals containing multilingual utterances of Chinese and English (e.g., audio signals in which the speaker switches languages, and/or distinct audio signals in which a same speaker uses different languages throughout). The server re-trains or fine-tunes the embedding extractors using the training embeddings extracted for this subset of training speakers. In some embodiments, the server applies the data augmentation operations (e.g., flip signal augmentation) on the training signals in the subset of training signals for retraining or fine-tuning.

In step 312, the server extracts one or more enrollment embeddings and enrollment voiceprint by applying the trained and fine-tuned embedding extractor on one or more enrollment signals during the enrollment operational phase. The server receives the enrollment signals for enrolling an enrolled user or for updating enrollment features or enrollment voiceprint for the enrolled user. During the deployment operational phase, the server extracts one or more inbound embeddings and inbound voiceprint by applying the trained embedding extractor on one or more inbound signals.

In step 314, the server generates a speaker verification score based on distance between the enrollment voiceprint and the inbound voiceprint. The server generates a similarity score (sometimes referred to as a "verification" score or the like) based on a distance between the enrolled voiceprint and the inbound voiceprint. The embedding extractor or other layers of the machine-learning architecture determine the distance (e.g., cosine distance) based upon comparing the inbound speaker voiceprint against the stored enrolled voiceprint embedding. The embedding extractor may then determine whether the inbound speaker voiceprint satisfies a voice-match or verification threshold score.

In some embodiments, the server (or another computing device) executes downstream operations using the extracted inbound voiceprint embedding and/or the similarity score. For example, an authentication routine may determine the likelihood of fraud or likelihood that the speaker is an enrolled speaker. As described further below, in some embodiments the server adjusts the similarity score according to a cross-lingual quality measure.

Figure 4:
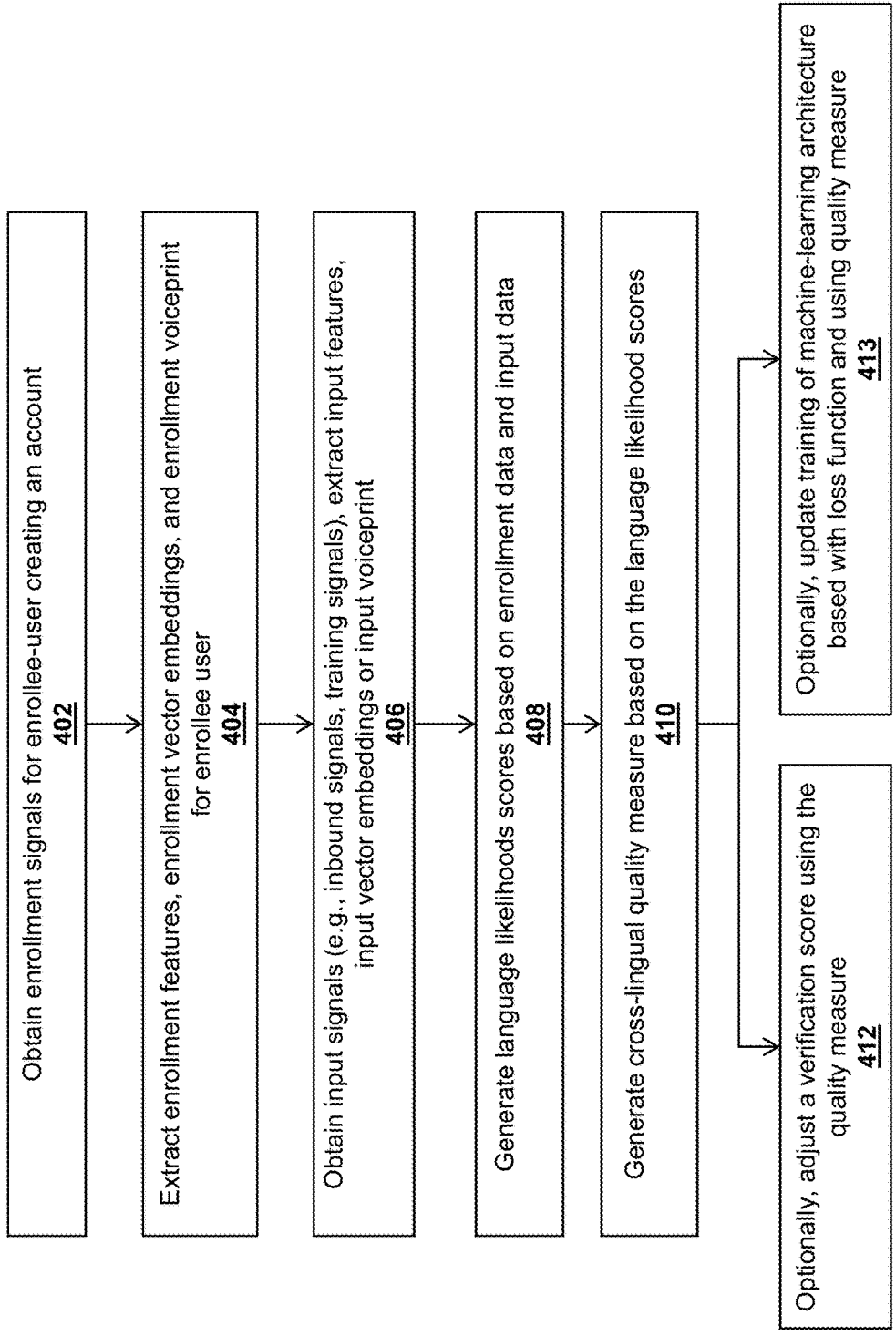
FIG. 4 shows execution steps of a computer-implemented method for adjusting a verification score generated by a machine-learning architecture, according to various language compensation functions performed by the machine-learning architecture, according to an embodiment.

FIG. 4 shows execution steps of a computer-implemented method 400 for adjusting a verification score generated by a machine-learning architecture, according to various language compensation functions performed by the machine-learning architecture. A server (e.g., analytics server 102) performs the steps of the method 400 by executing machine-readable software code that includes one or more machine-learning architectures, though embodiments may include any number of computing devices or any type of computing device that perform the various operations of the method 400. Embodiments may include additional, fewer, or different operations than those described in the method 400.

The server executes the machine-learning architecture comprising layers or functions defining an embedding extractor and a language engine containing a multi-class language classifier, among other potential sub-component engines, layers, or functions of the machine-learning architecture. In some embodiments, the machine-learning architecture constitutes multiple, distinct machine-learning architectures. In some embodiments, the machine-learning architecture includes a single machine-learning architecture. For ease of description, the machine-learning architecture of the method 400 constitutes the single machine-learning architecture. The server executes the software routines of the layers and functions of the machine-learning architecture in various operational phases, including a training phase, a deployment phase (sometimes referred to as the "testing phase" or "production phase"), and an optional enrollment phase (not shown in the example method 400).

The server ingests and applies the machine-learning architecture on one or more input audio signals, in accordance with the particular operational phase. The input audio signal refers to any audio signal that the server ingests and applies the machine-learning architecture on, including training signals during the training phase, enrollment signals received during the enrollment phase, and inbound audio signals received during the deployment phase.

In step 402, the server obtains enrollment signals for enrollee-user during an enrollment phase, performed when creating or updating an enrollee account. For instance, the enrollee-user registers a new user account with the analytics system or a service provider system according to various types of enrollment data including the enrollment audio signals, received from an end-user device or a service provider server. The server generates one or more new database records in user account databases (e.g., analytics database 104, provider database 112) and includes the various types of enrollment data, including enrollee-speaker information (e.g., identity information, language information).

In step 404, the server applies a trained embedding extractor on enrollment signals to extract enrollment features, enrollment embeddings, and an enrollment vector. The embedding extractor extracts various enrollment features based upon speech signals of the enrollment audio signals. Using the extracted enrollment features for each particular enrollment signal, the server extracts an enrolled embedding for the enrolled user. The server generates an enrolled voiceprint for the enrolled user by algorithmically combining (e.g., averaging, concatenating) each of the enrolled voiceprints extracted from the enrollment signals. The server stores the enrollment data for the enrolled user into the user account database, where the enrollment data may include, for example, the enrollment features, the enrolled embeddings, the enrolled voiceprint, and the enrolled speaker information (e.g., identity information, language information). In some instances, the server generates or receives updated versions of the enrollment data, according to retraining or tuning operations automatically performed by the machine-learning architecture or user inputs for updating certain information manually.

In step 406, the server obtains input signals (e.g., inbound signals, training signals), extracts input features, input speaker embeddings, or input voiceprint. The server applies a trained embedding extractor on input audio signals to extract input features, input embeddings, and an input vector. The embedding extractor extracts various input features based upon speech signals of the input audio signals. Using the extracted input features for each particular input signal, the server extracts an input embedding for the input user. The server generates an input voiceprint for the enrolled user by algorithmically combining (e.g., averaging, concatenating) each of the input voiceprints extracted from the input signals.

In some cases, the server performs the method 400 during the deployment phase. In such cases, the input audio signals constitute one or more inbound audio signals (as in a deployment phase). The server uses real-time or near real-time inbound contact data to determine whether the particular inbound speaker matches an enrolled speaker. Alternatively, the server receives a batch of inbound data from a database (e.g., analytics database 104, provider database 112) and performs the method 400 in a batch process at a later time. The server applies the machine-learning architecture on the batch of inbound contact data for one or more inbound speakers.

In some cases, the server performs the method 400 during the training phase (or re-training or tuning phase). In such cases, the input audio signals constitute one or more training audio signals. The server uses a batch of training data to determine whether the particular training speaker matches an enrolled speaker. The server receives the batch of training data from the database (e.g., analytics database 104, provider database 112) and performs the method 400 in a batch process. The server applies the machine-learning architecture on the batch of training contact data for one or more training speakers.

In step 408, the server applies a trained language engine on the enrollment voiceprints and one or more input voiceprint for the input speaker to generate one or more language likelihoods scores.

The server (or other device) trains a multi-class language classifier of the language engine (e.g., step 206; step 304) to discern any number of languages spoken within audio signals. The server may train the language classifier according to any type of machine-learning technique, such as SVM and LDA approaches, among others, using labels (e.g., training labels, stored user information, inbound speaker information) indicating the expected language and, in some cases, the expected speaker identity. Comparing these labels against the predicted embedding vectors (or combined voiceprint), the server trains the language classifier to calculate a language likelihood score as a soft output indicating the likely language(s) in a particular audio signal or pair of audio signals. In operation, the server applies the trained language classifier on each enrollment voiceprint and each input voiceprint to calculate a likely score for each language present in the audio signals.

For example, the embedding extractor or language engine extracts the enrollment voiceprint and the input voiceprint. The labels, stored data, or an administrative user indicates the number of expected languages in the audio signals. For each of the expected languages, the language engine calculates the language likelihood scores of the enrollment and input voiceprints. If the expected languages include English and Spanish, then the language engine calculates two language likelihood scores for the enrollment voiceprint (e.g., likelihood utterance is in English, likelihood utterance is in Spanish) and two language likelihood scores for the input voiceprint (e.g., likelihood utterance is in English, likelihood utterance is in Spanish).

In step 410, the server generates a cross-lingual quality measure based on the language likelihood scores. For each pair (or trial) of enrollment-side language likelihood score and input-side language likelihood score, the language engine determines a distance between the particular pair of language likelihood scores, then takes the absolute value of that distance. The language engine then sums each of these distances to determine the quality measure. A smaller quality measure indicates that the enrollment signal and input signal are from the same language, where as a larger quality indicates that the enrollment signal and input signal are from different languages.

Optionally, in step 412, the server adjusts a verification score (or similarity score) using the quality measure, thereby compensating for the language mismatches or discrepancies of the machine-learning architecture when the enrollee uses various different languages. The server may adjust the verification score according to any number of algorithmic functions. For instance, the server may simply subtract or add the quality measure with the verification score.

Optionally, in step 413, the server updates training (e.g., re-trains, tunes) for various layers, hyper-parameters, or weights of the embedding extractor or other aspects of the machine-learning architecture according to a loss function (e.g., LDA) or other machine-learning techniques (e.g., logistic regression) using the quality measure.

In some embodiments, a computer-implemented method comprises extracting, by a computer, an enrolled voiceprint for an enrolled speaker by applying an embedding extraction engine on one or more enrollment signals of the enrolled speaker; extracting, by the computer, an inbound voiceprint for an inbound speaker by applying the embedding extraction engine on one or more inbound signals of the inbound speaker; generating, by the computer, one or more language likelihood scores by applying a language classifier on the enrolled voiceprint and the inbound voiceprint indicating a likelihood that an enrollment signal and a paired inbound signal include a same language; and generating, by the computer, a cross-lingual quality measure based upon one or more differences of the one or more language likelihood scores generated for the one or more enrollment signals and the one or more inbound signals.

In some implementations, the method further includes generating, by the computer, a speaker verification score for the inbound speaker based upon a distance between the enrolled voiceprint and the inbound voiceprint; and updating, by the computer, the speaker verification score according to the cross-lingual quality measure for calibrating the distance.

In some implementations, the method further includes identifying, by the computer, the inbound speaker as the enrolled speaker in response to determining that the speaker verification score satisfies a verification threshold.

In some implementations, the method further includes obtaining, by the computer, a plurality of training audio signals having one or more utterances of one or more languages and a plurality of training labels corresponding to the plurality of training audio signals, each training label indicating the one or more languages in a corresponding audio training audio signal; extracting, by the computer, a plurality of training embeddings by applying the embedding extraction engine on the plurality of training audio signals; and training, by the computer, the language classifier for determining the language likelihood score by applying the language classifier on the plurality of training embeddings.

In some implementations, the method further includes obtaining, by the computer, a plurality of training audio signals having one or more utterances of one or more languages and a plurality of training labels corresponding to the plurality of training audio signals, each training label indicating the one or more languages in a corresponding training audio signal; extracting, by the computer, a plurality of training embeddings by applying the embedding extraction engine on the plurality of training audio signals; and training, by the computer, the one or more layers of the embedding extraction engine by applying a loss function on the plurality of training embeddings and the plurality of training labels corresponding to the plurality of training audio signals.

In some implementations, the method further includes retraining, by the computer, the one or more layers of the embedding extraction engine by applying the loss function on the cross-lingual quality measure, the enrolled voiceprint, and the verification score.

In some implementations, the method further includes selecting, by the computer, a subset of training audio signals having a plurality of languages of the plurality of training audio signals according to a subset of training labels of the plurality of training labels; and retraining, by the computer, the one or more layers of the embedding extraction engine by applying the loss function on the subset of training embeddings and the subset of training labels.

In some implementations, the method further includes, for each training audio signal of the plurality of training audio signals: extracting, by the computer, a plurality of features from the training audio signal; and generating, by the computer, an augmentation training signal corresponding to the training audio signal, the augmentation training signal comprising a plurality of reversed features corresponding to the plurality of features of the corresponding training audio signal.

In some embodiments, a system comprises a non-transitory storage configured to store machine-executable instructions of an embedding extractor and a language classifier and a computer in communication with the non-transitory storage. The computer comprises a processor and configured to: extract an enrolled voiceprint for an enrolled speaker by applying the embedding extractor on one or more enrollment signals of the enrolled speaker; extract an inbound voiceprint for an inbound speaker by applying the embedding extraction engine on one or more inbound signals of the inbound speaker; generate one or more language likelihood scores by applying the language classifier on the enrolled voiceprint and the inbound voiceprint indicating a likelihood that an enrollment signal and a paired inbound signal include a same language; generate a cross-lingual quality measure based upon one or more differences of the one or more language likelihood scores generated for the one or more enrollment signals and the one or more inbound signals; generate a speaker verification score for the inbound speaker based upon a distance between the enrolled voiceprint and the inbound voiceprint; and update the speaker verification score according to the cross-lingual quality measure for calibrating the distance.

In some implementations, the computer is further configured to generate a speaker verification score for the inbound speaker based upon a distance between the enrolled voiceprint and the inbound voiceprint; and update the speaker verification score according to the cross-lingual quality measure for calibrating the distance; and identify the inbound speaker as the enrolled speaker in response to determining that the speaker verification score satisfies a verification threshold.

In some implementations, the computer is further configured to: obtain a plurality of training audio signals having one or more utterances of one or more languages and a plurality of training labels corresponding to the plurality of training audio signals, each training label indicating the one or more languages in a corresponding audio training audio signal; extract a plurality of training embeddings by applying the embedding extraction engine on the plurality of training audio signals; and train the language classifier for determining the language likelihood score by applying the language classifier on the plurality of training embeddings.

In some implementations, the computer is further configured to: obtain a plurality of training audio signals having one or more utterances of one or more languages and a plurality of training labels corresponding to the plurality of training audio signals, each training label indicating the one or more languages in a corresponding audio training audio signal; extract a plurality of training embeddings by applying the embedding extraction engine on the plurality of training audio signals; and train the one or more layers of the embedding extraction engine by applying a loss function on the plurality of training embeddings and the plurality of training labels corresponding to the plurality of training audio signals.

In some implementations, the computer is further configured to retrain the one or more layers of the embedding extraction engine by applying the loss function on the cross-lingual quality measure, the enrolled voiceprint, and the verification score.

In some implementations, the computer is further configured to select a subset of training audio signals having a plurality of languages of the plurality of training audio signals according to a subset of training labels of the plurality of training labels; and retrain the one or more layers of the embedding extraction engine by applying the loss function on the subset of training embeddings and the subset of training labels.

In some implementations, the computer is further configured to, for each training audio signal of the plurality of training audio signals: extract a plurality of features from the training audio signal; and generate an augmentation training signal corresponding to the training audio signal, the augmentation training signal comprising a plurality of reversed features corresponding to the plurality of features of the corresponding training audio signal.

In some embodiments, a computer-implemented method comprises extracting, by the computer, a plurality of training embeddings extracted for a plurality of training audio signals and a corresponding plurality of training labels, each training label indicating in part one or more languages spoken in a corresponding training audio signal; training, by the computer, an embedding extractor by applying a loss function on the plurality of training embeddings and the plurality of training labels; selecting, by the computer, a subset of training audio signals of the plurality of training audio signals having a plurality of languages according to a subset of training labels of the plurality of training labels; and retraining, by the computer, the embedding extractor by applying the loss function on each training embedding for the subset of training embeddings and each corresponding training label subset of training labels.

In some implementations, the method further comprises, for each training audio signal of the plurality of training audio signals: extracting, by the computer, a plurality of features from the training audio signal; and generating, by the computer, an augmentation training signal corresponding to the training audio signal, the augmentation training signal comprising a plurality of reversed features corresponding to the plurality of features of the corresponding training audio signal.

In some implementations, the method further comprises extracting, by the computer, an enrollment voiceprint for an enrolled speaker by applying the embedding extractor on one or more enrollment signals; extracting, by the computer, an inbound voiceprint for an inbound speaker by applying the embedding extractor on one or more inbound signals; generating, by the computer, a speaker verification score for the inbound speaker based upon a distance between the enrolled voiceprint and the inbound voiceprint; and identifying, by the computer, the inbound speaker as the enrolled speaker in response to determining that the speaker verification score satisfies a verification threshold.

In some implementations, the method further comprises generating, by the computer, one or more language likelihood scores by applying a language classifier on the enrolled voiceprint and the inbound voiceprint indicating a likelihood that an enrollment signal and a paired inbound signal include a same language; generating, by the computer, a cross-lingual quality measure based upon one or more differences of the one or more language likelihood scores generated for the one or more enrollment signals and the one or more inbound signals; and updating, by the computer, the speaker verification score according to the cross-lingual quality measure for calibrating the distance.

In some implementations, the plurality of training audio signals include one or more utterances of one or more languages, and the plurality of training labels corresponding to the plurality of training audio signals indicate one or more languages in a corresponding training audio signal. The method further comprises training, by the computer, the language classifier for determining the language likelihood score by applying the language classifier on the plurality of training embeddings.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising: extracting, by a computer, an enrolled voiceprint for an enrolled speaker by applying an embedding extraction engine on one or more enrollment signals of the enrolled speaker, the enrolled voiceprint representing a plurality of enrollment acoustic features of the one or more enrollment signals; extracting, by the computer, an inbound voiceprint for an inbound speaker by applying the embedding extraction engine on one or more inbound signals of the inbound speaker, the inbound voiceprint representing a plurality of inbound acoustic features of the one or more inbound signals; generating, by the computer, one or more language likelihood scores by applying a language classifier on the enrolled voiceprint and the inbound voiceprint indicating a likelihood that an enrollment signal and a paired inbound signal include one or more languages; and generating, by the computer, a cross-lingual quality measure based upon one or more differences of the one or more language likelihood scores generated for the one or more enrollment signals and the one or more inbound signals, the cross-lingual quality measure indicating whether the enrollment signal and the paired inbound signal include a same language of the one or more languages.

2. The method according to claim 1, further comprising: generating, by the computer, a speaker verification score for the inbound speaker based upon a distance between the enrolled voiceprint and the inbound voiceprint; and updating, by the computer, the speaker verification score according to the cross-lingual quality measure for calibrating the distance.

3. The method according to claim 2, further comprising identifying, by the computer, the inbound speaker as the enrolled speaker in response to determining that the speaker verification score satisfies a verification threshold.

4. The method according to claim 1, further comprising: obtaining, by the computer, a plurality of training audio signals having one or more utterances of the one or more languages and a plurality of training labels corresponding to the plurality of training audio signals, each training label indicating the one or more languages in a corresponding audio training audio signal; extracting, by the computer, a plurality of training embeddings by applying the embedding extraction engine on the plurality of training audio signals; and training, by the computer, the language classifier for determining a language likelihood score by applying the language classifier on the plurality of training embeddings.

5. The method according to claim 1, further comprising: obtaining, by the computer, a plurality of training audio signals having one or more utterances of the one or more languages and a plurality of training labels corresponding to the plurality of training audio signals, each training label indicating the one or more languages in a corresponding training audio signal; extracting, by the computer, a plurality of training embeddings by applying the embedding extraction engine on the plurality of training audio signals; and training, by the computer, one or more layers of the embedding extraction engine by applying a loss function on the plurality of training embeddings and the plurality of training labels corresponding to the plurality of training audio signals.

6. The method according to claim 5, further comprising retraining, by the computer, the one or more layers of the embedding extraction engine by applying the loss function on the cross-lingual quality measure, the enrolled voiceprint, and a speaker verification score.

7. The method according to claim 5, further comprising: selecting, by the computer, a subset of training audio signals having a plurality of languages of the plurality of training audio signals according to a subset of training labels of the plurality of training labels; and retraining, by the computer, the one or more layers of the embedding extraction engine by applying the loss function on a subset of training embeddings corresponding to the subset of training audio signals and the subset of training labels.

8. The method according to claim 5, further comprising, for each training audio signal of the plurality of training audio signals: extracting, by the computer, a plurality of features from the training audio signal; and generating, by the computer, an augmentation training signal corresponding to the training audio signal, the augmentation training signal comprising a plurality of reversed features corresponding to the plurality of features of the corresponding training audio signal.

9. A system comprising: a non-transitory storage configured to store machine-executable instructions of an embedding extractor and a language classifier; and a computer in communication with the non-transitory storage, comprising a processor and configured to: extract an enrolled voiceprint for an enrolled speaker by applying the embedding extractor on one or more enrollment signals of the enrolled speaker, the enrolled voiceprint representing a plurality of enrollment acoustic features of the one or more enrollment signals; extract an inbound voiceprint for an inbound speaker by applying the embedding extractor extraction engine on one or more inbound signals of the inbound speaker, the inbound voiceprint representing a plurality of inbound acoustic features of the one or more inbound signals; generate one or more language likelihood scores by applying the language classifier on the enrolled voiceprint and the inbound voiceprint indicating a likelihood that an enrollment signal and the inbound voiceprint include one or more languages; generate a cross-lingual quality measure based upon one or more differences of the one or more language likelihood scores generated for the one or more enrollment signals and the one or more inbound signals, the cross-lingual quality measure indicating a likelihood that the enrollment signal and a paired inbound signal include a same language of the one or more languages; generate a speaker verification score for the inbound speaker based upon a distance between the enrolled voiceprint and the inbound voiceprint; and update the speaker verification score according to the cross-lingual quality measure for calibrating the distance.

10. The system according to claim 9, wherein the computer is further configured to: generate a speaker verification score for the inbound speaker based upon a distance between the enrolled voiceprint and the inbound voiceprint; update the speaker verification score according to the cross-lingual quality measure for calibrating the distance; and identify the inbound speaker as the enrolled speaker in response to determining that the speaker verification score satisfies a verification threshold.

11. The system according to claim 9, wherein the computer is further configured to: obtain a plurality of training audio signals having one or more utterances of the one or more languages and a plurality of training labels corresponding to the plurality of training audio signals, each training label indicating the one or more languages in a corresponding audio training audio signal; extract a plurality of training embeddings by applying the embedding extractor extraction engine on the plurality of training audio signals; and train the language classifier for determining a language likelihood score by applying the language classifier on the plurality of training embeddings.

12. The system according to claim 9, wherein the computer is further configured to: obtain a plurality of training audio signals having one or more utterances of the one or more languages and a plurality of training labels corresponding to the plurality of training audio signals, each training label indicating the one or more languages in a corresponding audio training audio signal; extract a plurality of training embeddings by applying the embedding extractor extraction engine on the plurality of training audio signals; and train one or more layers of the embedding extractor extraction engine by applying loss function on the plurality of training embeddings and the plurality of training labels corresponding to the plurality of training audio signals.

13. The system according to claim 12, wherein the computer is further configured to retrain the one or more layers of the embedding extractor extraction engine by applying the loss function on the cross-lingual quality measure, the enrolled voiceprint, and the speaker verification score.

14. The system according to claim 12, wherein the computer is further configured to: select a subset of training audio signals having a plurality of languages of the plurality of training audio signals according to a subset of training labels of the plurality of training labels; and retrain the one or more layers of the embedding extractor extraction engine by applying the loss function on the subset of training embeddings and the subset of training labels.

15. The system according to claim 12, wherein the computer is further configured to, for each training audio signal of the plurality of training audio signals: extract a plurality of features from the training audio signal; and generate an augmentation training signal corresponding to the training audio signal, the augmentation training signal comprising a plurality of reversed features corresponding to the plurality of features of the corresponding training audio signal.

* * * * *